United States Patent
Abdulla et al.

(10) Patent No.: US 11,048,556 B2
(45) Date of Patent: Jun. 29, 2021

(54) MULTI-CHANNEL, MULTI-CONTROL LOGICAL PARTITION MIGRATION

(71) Applicant: International Business Machines Corporation, Armonk, NY (US)

(72) Inventors: Rizwan Sheikh Abdulla, Bangalore (IN); Kuntal Dey, New Delhi (IN); Konda Reddy Dumpa, Bangalore (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/951,801

(22) Filed: Apr. 12, 2018

(65) Prior Publication Data
US 2019/0317820 A1    Oct. 17, 2019

(51) Int. Cl.
*G06F 9/455*   (2018.01)
*G06F 9/46*    (2006.01)
*G06F 9/50*    (2006.01)

(52) U.S. Cl.
CPC ........ *G06F 9/5044* (2013.01); *G06F 9/45533* (2013.01); *G06F 9/5022* (2013.01); *G06F 9/5077* (2013.01)

(58) Field of Classification Search
CPC ............. G06F 9/45533; G06F 9/45558; G06F 2009/4557; G06F 9/5077; G06F 9/5044;
(Continued)

(56) References Cited

U.S. PATENT DOCUMENTS 6,526,447 B1 * 2/2003 Giammaria ............. H04L 67/06
                                                        709/224
6,883,065 B1 * 4/2005 Pittelkow ............ G06F 11/0727
                                                        709/206

(Continued)

FOREIGN PATENT DOCUMENTS

EP         2605138 B1      3/2017

OTHER PUBLICATIONS

Batalha et al., Integrated Virtualization Manager for IBM Power Systems Servers, Dec. 2012, IBM International Technical Support Organization, p. ix-18, (Year: 2012).*

(Continued)

*Primary Examiner* — Emerson C Puente
*Assistant Examiner* — Zhi Chen
(74) *Attorney, Agent, or Firm* — Scully, Scott, Murphy & Presser, P.C.

(57) ABSTRACT

A system and method, including multi-channel, multi-control system and method, for transferring a logical partition in a virtualized computer network is disclosed. The system and method includes a source server having a logical partition and a Virtualized Input/Output Server (VIOS), where the VIOS has logical partition migration capabilities; a target server for receiving the logical partition; and a target migration console associated with the target server, where the system is configured to transfer the logical partition using the VIOS on the source server and the target migration console. The system and method may include, or be configured to prepare, a connection between the VIOS of the source server and the target migration console, and may further include and be configured in an embodiment to transfer the logical configuration using a management processor on the source server and a source management console associated with the source server.

18 Claims, 6 Drawing Sheets

(58) Field of Classification Search
CPC .... G06F 9/5022; G06F 9/5083; G06F 9/5088; G06F 9/5055; G06F 9/505; G06F 11/16; G06F 11/20; G06F 11/1666; G06F 11/2002; G06F 11/2017; G06F 11/202; G06F 11/2053; G06F 11/2097; G06F 11/14; G06F 11/1402; G06F 11/1479
See application file for complete search history.

(56) References Cited

U.S. PATENT DOCUMENTS

| | | | | |
|---|---|---|---|---|
| 7,783,779 | B1* | 8/2010 | Scales | G06F 9/5077 709/207 |
| 8,020,034 | B1* | 9/2011 | Shrivastava | G06F 11/1482 709/226 |
| 8,621,121 | B1* | 12/2013 | Bappe | G06F 11/2007 710/11 |
| 9,621,421 | B1* | 4/2017 | Tolentino | H04L 41/0816 |
| 9,712,456 | B2 | 7/2017 | Anumalasetty et al. | |
| 9,747,311 | B2 | 8/2017 | Buehne et al. | |
| 2009/0307713 | A1* | 12/2009 | Anderson | G06F 11/0712 719/313 |
| 2010/0122111 | A1* | 5/2010 | Allen | G06F 11/2005 714/3 |
| 2012/0036214 | A1* | 2/2012 | Pafumi | G06F 9/4856 709/215 |
| 2013/0031341 | A1* | 1/2013 | Ganti | G06F 9/5077 713/2 |
| 2013/0238786 | A1* | 9/2013 | Khesin | H04L 67/34 709/224 |
| 2013/0268800 | A1 | 10/2013 | Rangaiah | |
| 2013/0318297 | A1* | 11/2013 | Jibbe | G06F 3/061 711/114 |
| 2014/0129716 | A1* | 5/2014 | Garza | G06F 9/00 709/226 |
| 2015/0052282 | A1* | 2/2015 | Dong | G06F 13/32 710/308 |
| 2015/0150000 | A1* | 5/2015 | Anumalasetty | G06F 3/06 718/1 |
| 2015/0188780 | A1* | 7/2015 | Spieser | H04L 41/5009 370/252 |
| 2015/0365274 | A1* | 12/2015 | Anumalasetty | H04L 41/082 709/221 |
| 2016/0041601 | A1* | 2/2016 | Larson | G06F 1/3287 713/320 |
| 2017/0024261 | A1* | 1/2017 | Atluri | G06F 9/45558 |
| 2017/0242756 | A1 | 8/2017 | Arroyo et al. | |

OTHER PUBLICATIONS

Veritas InfoScale 7.3, Virtualization Guide—AIX, May 31, 2017 (document attached as part 1 and 2).

* cited by examiner

US 11,048,556 B2

MULTI-CHANNEL, MULTI-CONTROL LOGICAL PARTITION MIGRATION

BACKGROUND OF THE INVENTION

The present invention relates generally to the field of computer resource virtualization, and more particularly to logical partition migration between physical computing systems.

Computer systems typically include a combination of hardware and software components, application programs, operating systems, processors, buses, memory, input/output devices, etc. One area of advancement includes data centers providing cloud services with various types of virtualization services. Most computer virtualization systems and services create logical partitions (LPARs), also referred to as virtual machines (VM), on a computer system, such as, for example, a computer server. The virtual machine or logical partition (LPAR) is generally a software-based emulation of a physical computer. Numerous virtual machines or logical partitions may reside on a physical computer, e.g., a server. Most virtualization services make use of massive amounts of data input/output (I/O) traffic and network bandwidth. The massive amounts of data are usually stored in a network of storage devices that may be linked together and accessed through a storage area network (SAN). The storage area network (SAN) is divided into logical units identified by logical unit numbers (LUNs). The virtual machine or LPAR accesses necessary storage devices or LUNs using virtual ports which correspond to physical ports on the host computer server that are connected to the storage area network (SAN). Each virtual connection between the virtual machine or LPAR has a World Wide Port Name (WWPN).

Logical partition migration (LPM) allows a system administrator or other user to migrate a logical partition (LPAR), or virtual machine (VM), from one server computer (source server computer), or central electronics complex (CEC), to another server computer (destination server computer) or another CEC. The virtual machine (VM) or LPAR that is being moved in the LPM operation is known as the "mobile partition." In such virtualized computing environments, logical partition mobility or migration (LPM), in which a logical partition (LPAR), or virtual machine (VM), executing on a first host computer server is migrated to a second host (target or destination) computer server, may be performed for a number of reasons, including to avoid outages for planned server maintenance, for load balancing across multiple servers, for energy conservation, and the like.

SUMMARY

The summary of the disclosure is given to aid understanding of a computer system, virtualized computer architectural structure, and method of performing logical partition migration (LPM), and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure and method of operation to achieve different effects.

According to an embodiment, a method for transferring a logical partition from a source server to a target or destination server is provided. An embodiment may also include a method of migrating resources in a computing environment, the computing environment comprising a source system and a target system, the method including initiating a transfer of a logical partition on the source system to the target system; checking the status of a source management processor on the source computer system and a source migration console associated with the source system to determine whether the source management processor and source migration console are capable of transferring the logical partition to the target computer system; and transferring the logical partition from the source computer system to the target computer system using an alternative channel where the management processor of the source computer system is not utilized. The method further includes in an embodiment identifying the target computer system to receive the logical partition, establishing a connection between a target migration console connected to the target computer system and the VIOS of the source computer system, and/or migrating the logical partition using an a Virtual Input/Output Server (VIOS) of the source computer system.

A system providing for transfer of a logical partition in a virtualized computing system is also disclosed. The system includes a source server having a logical partition and a Virtualized Input/Output Server (VIOS), wherein the VIOS has logical partition migration capabilities, a target server for receiving the logical partition, and a target migration console associated with the target server, where the system is configured to transfer the logical partition using the VIOS on the source server and the target migration console. The system in an embodiment further includes a source management processor on the source server and a source migration console associated with the source server, the system configured to transfer the logical configuration using the management processor and the source management console, and where the system is further configured to transfer the logical partition to the target server using the VIOS and the target migration console if the system cannot transfer the logical partition using the source management processor and the source migration console. In an embodiment, the system is configured to prepare a connection between the VIOS of the source server and the target migration console, and in a further embodiment the VIOS on the source server further includes an Integrated Virtualization Manager (IVM) configured and programmed to have logical partition capabilities.

In another embodiment, a computer system for transferring a logical partition from a source server to a target server is disclosed. According to an embodiment, the computer system has one or more computer processors, one or more computer readable non-transitory storage media, and program instructions stored on the one or more computer readable non-transitory storage media for execution by at least one of the one or more computer processors, the program instructions having program instructions to initiate transfer of the logical partition from the source server to the target server, program instructions to transfer the logical partition from the source server to the target server using a source management processor associated with the source server, and program instructions to transfer the logical partition from the source server to the target server using a Virtual Input/Output Server (VIOS) associated with, preferably connected to, the source server. In an embodiment, the computer system has program instructions to check for requests to transfer the logical partition, program instructions to check the status of the source management processor and a source migration console associated with the source server to determine whether the source management processor and the source migration console are capable of transferring the logical partition, program instructions to use the source management processor and source migration console to transfer the logical partition to the target sever if they are operational, and/or program instructions to check the VIOS of the server system to determine whether the logical partition migration capabilities of the VIOS of the source server are activated.

BRIEF DESCRIPTION OF THE DRAWINGS

The various aspects, features and embodiments of the computer system, computer architectural structure, and its method of operation will be better understood when read in conjunction with the figures provided. Embodiments are provided in the figures for the purpose of illustrating aspects, features and/or various embodiments of the computer system, computer architectural structure, and method of operation, but the claims should not be limited to the precise arrangement, structures, features, aspects, embodiments or devices shown, and the arrangements, structures, subassemblies, features, aspects, methods, processes, embodiments, methods, and devices shown may be used singularly or in combination with other arrangements, structures, subassemblies, features, aspects, embodiments, methods and devices.

DETAILED DESCRIPTION

Figure 1:
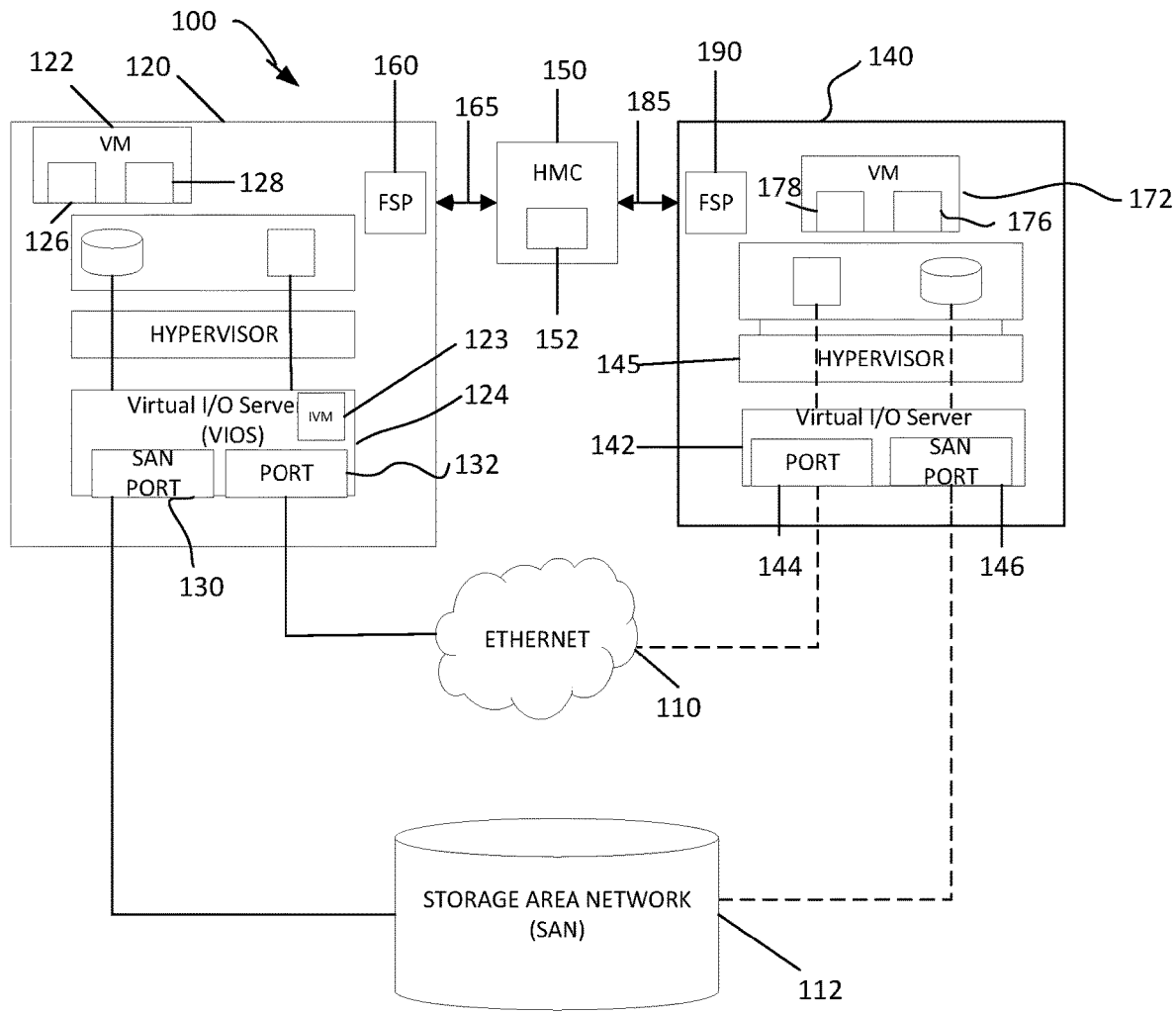
FIG. 1 is a functional block diagram illustrating a virtualized server computing environment, in accordance with an embodiment of the present invention.

The following description is made for illustrating the general principles of the invention and is not meant to limit the inventive concepts claimed herein. In the following detailed description, numerous details are set forth in order to provide an understanding of the computer system, computer architectural structure, and method of operation, however, it will be understood by those skilled in the art that different and numerous embodiments of the computer system, computer architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

As indicated earlier, virtual machines or logical partitions from one computer server (source server) can be migrated to another computer server (target or destination server) using logical partition mobility (migration) or LPM. Preferably, the logical partitions or virtual machines can be migrated while they are live, e.g., operational. In known methods of migrating logical partitions or virtual machines between computer servers the management or service processor, also referred to in embodiments as the Flexible Service Processor (FSP), on the source server computer communicates with a management console such as, for example, a Hardware Management Console (HMC), to facilitate and/or control migration or transfer of the logical partition to a target server computer. A problem may arise if the management or service processor, e.g., Flexible Service Processor (FSP), on the source server, which is on a separate internet protocol (IP) from the rest of the server system, does not work or does not connect with the migration console, e.g. HMC, as transfer or migration of the logical partition or virtual machine cannot happen, even if the system is otherwise operational.

The system, architectural structure and/or method disclosed overcomes the problem when the management or service processor, e.g., the Flexible Service Processor (FSP) on the source server cannot interact with the source migration console, e.g., the Hardware Management Console (HMC), to facilitate migration of the logical partition or virtual machine to an alternative server by providing, in an embodiment, multi-channel abilities and control to transfer logical partitions or virtual machines to an alternative server, e.g., target or destination server. In an embodiment the VIOS of the source server, and specifically in an embodiment the Integrated Virtualization Manager (IVM) module, is provided with migration capabilities and the source VIOS enables and facilitates a connection with the target migration console for migration of the logical partition.

FIG. 1 is a functional block diagram illustrating a virtualized server computing environment ("environment"), generally designated 100, in accordance with an exemplary embodiment. Environment 100 includes source server computer 120, destination or target server computer 140, and hardware management console (HMC) 150. Source server computer 120 and target server 140 are interconnected via network 110. Environment 100 also includes storage server or storage area network (SAN) 112, which may include for example a small computer system interface (SCSI) storage device, which is connected to source server computer 120 and destination server computer 140 via storage area network (SAN) 112. While FIG. 1 illustrates two servers, it can be appreciated that virtualized computing environment 100 may include two or more servers.

Common types of computing devices are desktop computers and server systems. As for information and data storage, an increasingly common technology is referred to as storage area networking, or simply storage area network (SAN). SAN technology comprises connecting remote computer storage devices, such as disk arrays and optical storage arrays, to servers and other computing devices in such a way that the storage devices preferably appear as locally attached devices to the computing devices and the operating system which share the storage devices.

Fibre channel switches often connect servers and other computing devices to SANs. In a conventional fibre channel SAN, an Input/Output Controller or Host Bus Adapter (HBA) includes an N_Port connected to a fibre channel switch or storage devices via a fibre channel link. N_Port ID Virtualization (NPIV) is a method for virtualizing a physical fibre channel port. Using NPIV, multiple virtual machines (VMs), also referred to as logical partitions, LPARs, or NPIV clients, can be created and have access to the storage area network (SAN) or storage server. NPIV allows a fabric-attached N_Port to claim multiple fibre channel addresses. Each virtual connection between the virtualized machine or LPAR and the storage device or SAN is provided a World Wide Port Name (WWPN) and each address appears as a unique entity on the fibre channel fabric. The virtual machines will have a virtual fibre channel port and will be able to access the storage on the SAN similar to how physical ports access storage on the SAN. Utilizing NPIV, multiple World-Wide Port Names (WWPNs) and fibre channel addresses recognizable by the fibre channel switch can be assigned to a single physical channel link and N_Port.

Storage servers in the storage area network (SAN) have multiple ports (called target ports in SCSI terminology) and the storage devices in the storage server (e.g., the SAN) are accessible to the host (source) servers through the storage server ports. In a SAN configuration there may be multiple I/O paths to reach the storage devices from a host server. An I/O path is the information or configuration to access a storage device. An I/O path is a combination of initiator, target port, and storage device. So in the case of a virtual machine on a server (e.g., source server), the initiator is the virtual machine (e.g., the virtual port of the virtual machine), the target port is the storage port of the SAN or storage server, and the storage device may be a disk on the storage server (or SAN). If one of the I/O path fails, then the I/O path may switch to other available paths.

Network 110 may be, for example, a local area network (LAN), a wide area network (WAN), such as the Internet, a dedicated short range communications network, or any combination thereof, and may include wired, wireless, fiber optic, or any other connection known or as of yet unknown in the art. In general, the communication network can be any combination of connections and protocols that will support communication between source server computer 120 and destination server computer 140. In the exemplary embodiment depicted in FIG. 1, network 110 represents connections between source server computer 120 and destination server computer 140 using standard Ethernet connections.

In various embodiments, source server computer 120, destination server computer 140, and hardware management console (HMC) 150 can each be a server, a laptop computer, a tablet computer, a netbook computer, a personal computer (PC), or a desktop computer. Other computing devices are contemplated for source server 120, destination server 140, and/or HMC 150. In another embodiment, source server computer 120, destination server computer 140, and hardware management console 150 represent one or more computing systems utilizing clustered computers and components to act as a single pool of seamless resources when accessed via network 110. In general, hardware management console 150 can be any computing device or a combination of devices capable of executing and having access to migration manager program 152. Hardware management console 150 may include internal and external hardware components, as depicted and described in further detail with respect to FIG. 6.

Source server computer 120 includes virtual machine (VM) 122 and source virtual input/output server (VIOS) 124. VM 122 is a virtual computing environment. Source computer 120 may also include other components, physical and/or virtualized, including, for example, a hypervisor 125. In an exemplary embodiment, VM 122 represents a logical partition (LPAR) or NPIV client, which is a software-based emulation of a physical computer. VM 122 may be a system LPAR, in which a complete system platform supports the execution of a complete operating system, including using virtualized hardware (e.g., virtualized I/O ports). In an embodiment, source server computer 120 may include one or more virtual machines or LPARs, and one or more mobile partitions, which are specific LPARs that are subject to an imminent live partition migration in which the mobile partition is moved from a source server computer (e.g., source server computer 120) to a destination server computer (e.g., destination server computer 140). In general, VM 122 can be any LPAR that can access storage area network (SAN) 112 and can undergo migration or transfer operation from a source server computer (e.g., source server computer 120) to a destination server computer (e.g., destination server computer 140).

VM 122 includes port 126 and port 128. Port 126 is a virtual port used by VM 122 to communicate with storage server or storage area network (SAN) 112. In the exemplary embodiment, port 126 is a virtual Fibre channel port that VM 122 generates for use in a virtual Fibre channel fabric, and identified by the name "WWPN-A". In general, port 126 can have any unique identifier used to denote the virtual port in a VM (e.g., VM or LPAR 122) on a source server computer (e.g., source server computer 120). Port 128 is a virtual port in VM 122 that facilitates communication between VM 122 and other computer systems (e.g., hardware management console 150 and/or destination server computer 140). In the exemplary embodiment, port 128 is a virtual Ethernet port that supports communication between VM 122 and other computer systems (e.g., hardware management console 150 and/or destination server computer 140) via network 110. In general, port 128 can be any virtualized port utilized by VM 122 to communicate with computer systems via network 110.

Source VIOS 124 is a virtualized I/O server which allows source server computer 120 to generate one or more "virtual" I/O ports, which correspond to one or more physical ports. In the exemplary embodiment of FIG. 1, source VIOS 124 uses virtual networking to map one or more physical ports on source server computer 120 (e.g., port 132) to one or more VMs (e.g., VM or LPAR 122) via one or more virtual ports (e.g., port 128). In general, source VIOS 124 can be implemented with any technology that enables one physical network adapter (such as a network adapter card, or Ethernet port) to simulate multiple virtual network adapters that are compatible with one or more VMs (e.g., VM or LPAR 122) on a source server computer (e.g., source server computer 120). The source VIOS 124 includes an Integrated Virtualization Manager (IVM) feature or module 123. The IVM module 123 manages the VIOS and the logical partitions or virtual machines 122. The IVM 123 provides a web-based system management interface and a command-line interface that can be used to manage the source server. The IVM 123 can be used to configure the managed system through the VIOS 124. In an embodiment, the IVM has capabilities to perform a logical partition or virtual machine migration. The partition migration capabilities in an embodiment are provided as programming in the IVM.

Source VIOS 124 also includes SAN port 130 and port 132. In the exemplary embodiment of FIG. 1, SAN port 130 is a physical port that facilitates communication between VM 122 and storage area network (SAN) 112. In this embodiment, SAN port 130 is a physical Fibre channel port that communicates with VM 122 via a virtual Fibre channel connection addressed to port 126, which is a virtual Fibre channel port within VM 122. In general, SAN port 130 can be any physical port that facilitates communication between a virtual machine or LPAR on a source server computer and one or more fibre channel switches or one or more storage devices via a storage server or storage area network (SAN).

Port 132 is a physical port on source server computer 120. In the exemplary embodiment, port 132 is a physical Ethernet port that supports communication between VM 122, via communication with port 128, and other computer systems (e.g., destination server computer 140) via network 110. In general, port 132 can be any physical port in a source server computer that can facilitate communication between a VM and other computer systems via network 110.

Destination server computer 140 includes virtual machine (VM) 172 and destination VIOS 142. Destination computer 140 may include other components, physical and/or virtualized, including, for example, a hypervisor 145. VM 172 is a virtual computing environment. In an exemplary embodiment, VM 172 represents logical partition (LPAR) or NPIV client, which is a software based emulation of a computer. VM 172 may be a system LPAR, in which a complete system platform supports the execution of a complete operating system, including using virtualized hardware (e.g., virtualized I/O ports). In an embodiment, destination server computer 140 can include one or more virtual machines or LPARs, and one or more mobile partitions.

VM 172 includes port 176 and port 178. Port 176 is a virtual port used by VM 172 to communicate with storage server or storage area network (SAN) 112. In the exemplary embodiment, port 176 is a virtual Fibre channel port that VM 172 generates for use in a virtual Fibre channel fabric, and identified by the name "WWPN-B". In general, port 176 can have any unique identifier used to denote the virtual port in a VM (e.g., VM or LPAR 172) on a destination server computer (e.g., destination server computer 140). Port 178 is a virtual port in VM 172 that facilitates communication between VM 172 and other computer systems (e.g., source server computer 120). In the exemplary embodiment, port 178 is a virtual Ethernet port that supports communication between VM 172 and other computer systems (e.g., hardware management console 150 and/or source server computer 120) via network 110. In general, port 178 can be any virtualized port utilized by VM 172 to communicate with computer systems via network 110.

In an exemplary embodiment, destination VIOS 142 is a virtualized I/O server which allows destination server computer 140 to generate one or more "virtual" I/O ports, which correspond to one or more physical ports. In the exemplary embodiment of FIG. 1, destination VIOS 142 uses virtual networking to map one or more physical ports on destination server computer 140 (e.g., port 144) to one or more VMs 172 via one or more virtual ports (e.g., port 178). In various embodiments, destination VIOS 142 can utilize one or more physical ports to facilitate communication between VM 172. In some embodiments, destination VIOS 142 includes the same types of physical ports as source VIOS 124 (e.g., port 144 is of the same type as port 132 (Ethernet)). In general, destination VIOS 142 can be any technology that enables one physical network adapter (such as a network adapter card, or Ethernet port) to simulate multiple virtual network adapters that are compatible with one or more VMs or logical partitions on a destination server computer (e.g., destination server computer 140).

Destination VIOS 142 includes port 144 and SAN port 146. In the exemplary embodiment of FIG. 1, port 144 is a physical port in destination server computer 140 and facilitates communication between destination server computer 140 and source server computer 120 via network 110. As such, in the exemplary embodiment, port 144 is of the same type as port 132 (i.e., Ethernet). In general, port 144 can be any type of physical port which corresponds to a physical port in a destination server computer and facilitates communication between the destination server and source server via a network. In the exemplary embodiment of FIG. 1, SAN port 146 is a physical port on destination server computer 140 that can facilitate communication between VM 172 and storage area network (SAN) 112. In the exemplary embodiment, SAN port 146 is a Fibre channel port that can communicate with VM 172 on destination server computer 140 via a virtual connection addressed to virtual port 176. In general, SAN port 146 can be any physical port that facilitates communication between a VM or logical partition on a destination server computer and a storage area network (SAN).

Storage area network (SAN) 112 can be, for example, an advanced technology attachment over Ethernet network (ATA over Ethernet or AoE), a Fibre channel protocol network, an enterprise systems connection (ESCON), a Fibre channel over Ethernet (FCoE), an HyperSCSI network, or any other type of storage area network for communication between server computers (e.g., source server computer 120 and destination server computer 140) and storage area network devices (e.g., SCSI storage device). In the exemplary embodiment of FIG. 1, storage server or storage area network (SAN) 112 is a Fibre channel protocol that maps over a Fibre channel connection.

A storage area network (e.g., storage area network 112) may include one or more storage devices. The storage devices may be quite numerous and/or heterogeneous. Such storage devices may include tape libraries, a single or groups of disk drives (e.g., Just a Bunch of Disks or JBOD) solid state memory devices, optical drives, storage arrays, etc. In general, a storage device in storage server or SAN 112 can be any storage unit that supports read/write operations. In the exemplary embodiment, the storage device is a dedicated storage SCSI device, such as a disk array, tape library, or optical jukebox. Storage virtualization techniques establish relationships between physical storage devices, e.g., disk drives, tape drives, optical drives, etc., and virtual or logical storage devices such as logical units or LUNs. In the exemplary embodiment, storage server or SAN 112 may have one or more logical units. In the exemplary embodiment, logical unit numbers (LUNs) can be any number used to identify a storage device or a logical unit (i.e., subdivision) thereof.

Hardware management console 150 is a computer hardware system used to manage the software configuration and operation of one or more LPARs within environment 100. Hardware management console 150 includes migration manager 152 to handle partition migration. The partition migration program directs the transfer of mobile partitions from source server computer 120 to destination server computer 140. Preferably, the transfer is a live migration of the logical partition or virtual machine from the source server to the destination server. The migration manager 152 preferably is run as a separate component within 150, and can be accessed via HMC IP. The system 100 may contain one or more migration consoles 150. For example, in the embodiment of FIG. 3, multiple migration consoles 150 are illustrated as Hardware Management Consoles (HMCs) 170 and 180.

In the embodiment of FIG. 1, the host server 120, which includes VM 122, includes a management or service processor, e.g., Flexible Service Processor or FSP 160, to facilitate management and control of the source server 120. The management processor 160 may include firmware that provides diagnostics, initialization, configuration, run-time error detection and correction. The migration console, e.g., HMC 150, is connected to the management processor (e.g., FSP 160) of the source server 120, and may be connected to a dedicated port of the management processor via an Ethernet connection 165. In the embodiment of FIG. 1, the destination server 140, which may include one or more virtual machines or logical partitions, also includes a management or service processor, e.g., Flexible Service Processor or FSP 190, to facilitate management and control of the destination sever 140. The management processor 190 may include firmware that provides diagnostics, initialization, configuration, run-time error detection and correction. The migration console, e.g. HMC 150, is connected to the management processor (e.g., FSP 190) of the destination server 140, and may be connected to a dedicated port of the management processor via an Ethernet connection 185.

In the virtualization environment of FIG. 1, an attempt to migrate VM 122 in source server 120 to destination server 140 (i.e., attempt a LPM operation) will fail when the management processor 160, e.g., FSP 160, is not operational or the connection between the management processor 160 and the migration console 150, e.g., HMC 150, is not operational.

Disclosed is a system, computer architecture, and method to provide multi-channel, multi-control transfer or migration of logical partitions or virtual machines. Multi-channel, multi-control logical partition migration may be advantageous and implemented in an environment where the management or service processor in the source server is not operational, or where the connection between the management or service processor and the migration console is not operational. That is, a multi-channel system, architecture, and/or method may be advantageous when one of the channels, e.g., the primary channel, to effectuate transfer of the logical partition, e.g., the channel between the management processor and migration console, is inactive and/or not operational.

A system, computer architecture, and method to transfer logical partitions or virtual machines that has and/or uses dual-channel, preferably dual-control, migration capabilities is disclosed. When a migration or transfer process is initiated, in an embodiment, the system will determine whether or not the management or service processor of the source system or server 120 is operational or not, and/or will determine whether the connection 165 between the management processor 160 and the migration console 150 is operational. If the management processor 160 cannot communicate with migration console 150, the system will use alternate channels, e.g., invoke the Integrated Virtualization Manager (IVM) 123 on the VIOS 124 of the source system where the logical partition resides, to facilitate migration of the logical partition or virtual machine from the source server 120 to the target or destination server 140. In an embodiment, the IVM will act as the source migration console as the source IVM has capabilities to perform logical partition or virtual machine migration. After the mobile (logical) partition is moved to the destination server 140, in an embodiment, the new I/O path will be activated.

Figure 2:
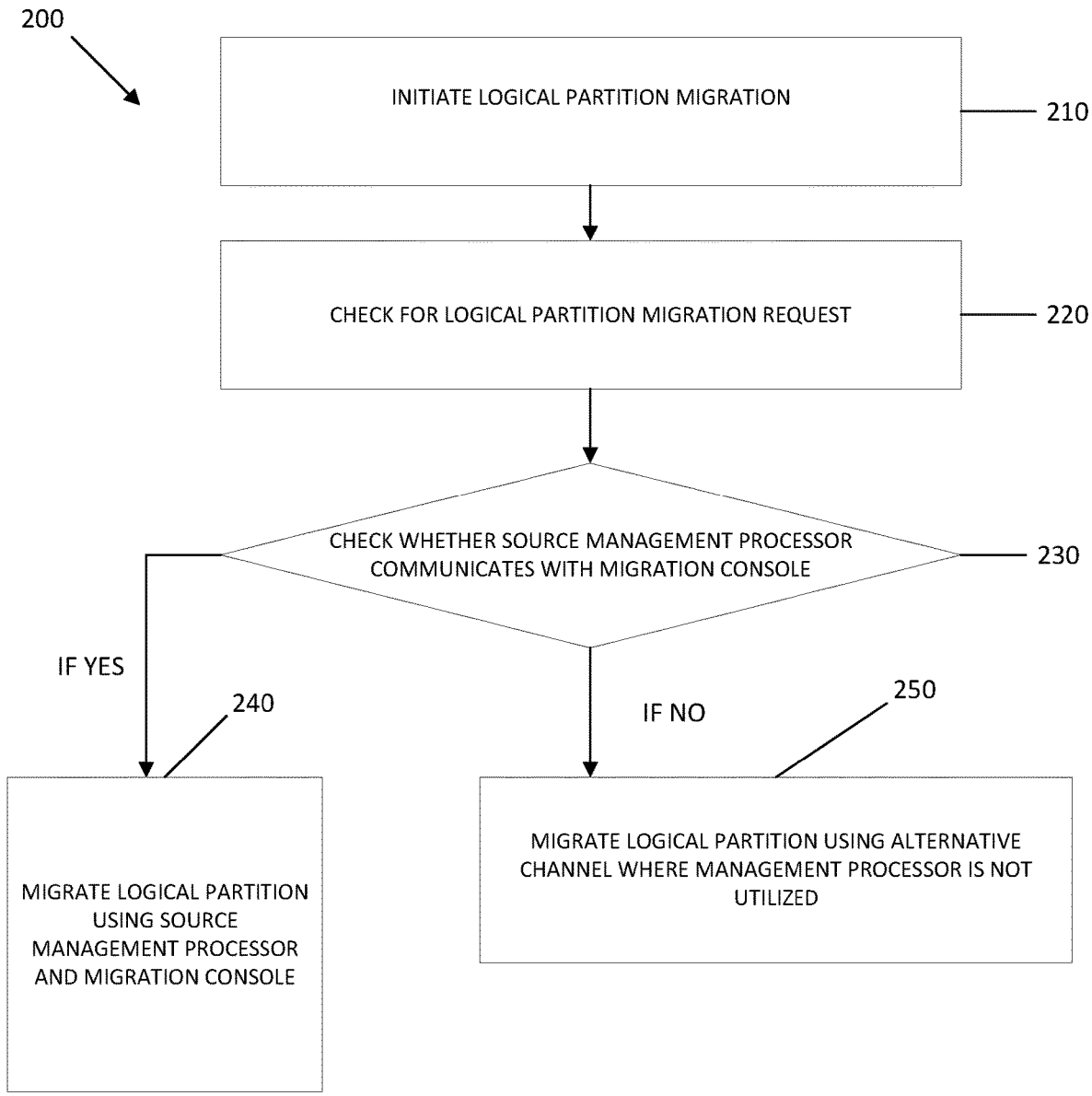
FIG. 2 is a flowchart depicting operational steps of a logical partition migration within the environment of FIG. 1, in accordance with an embodiment of the present invention.

FIG. 2 is an exemplary flowchart in accordance with one embodiment illustrating and describing a method of performing partition migration or transfer in accordance with one embodiment of the present disclosure. While the migration method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, simultaneously, or the steps may be performed in the order disclosed or in an alternate order.

Figure 3:
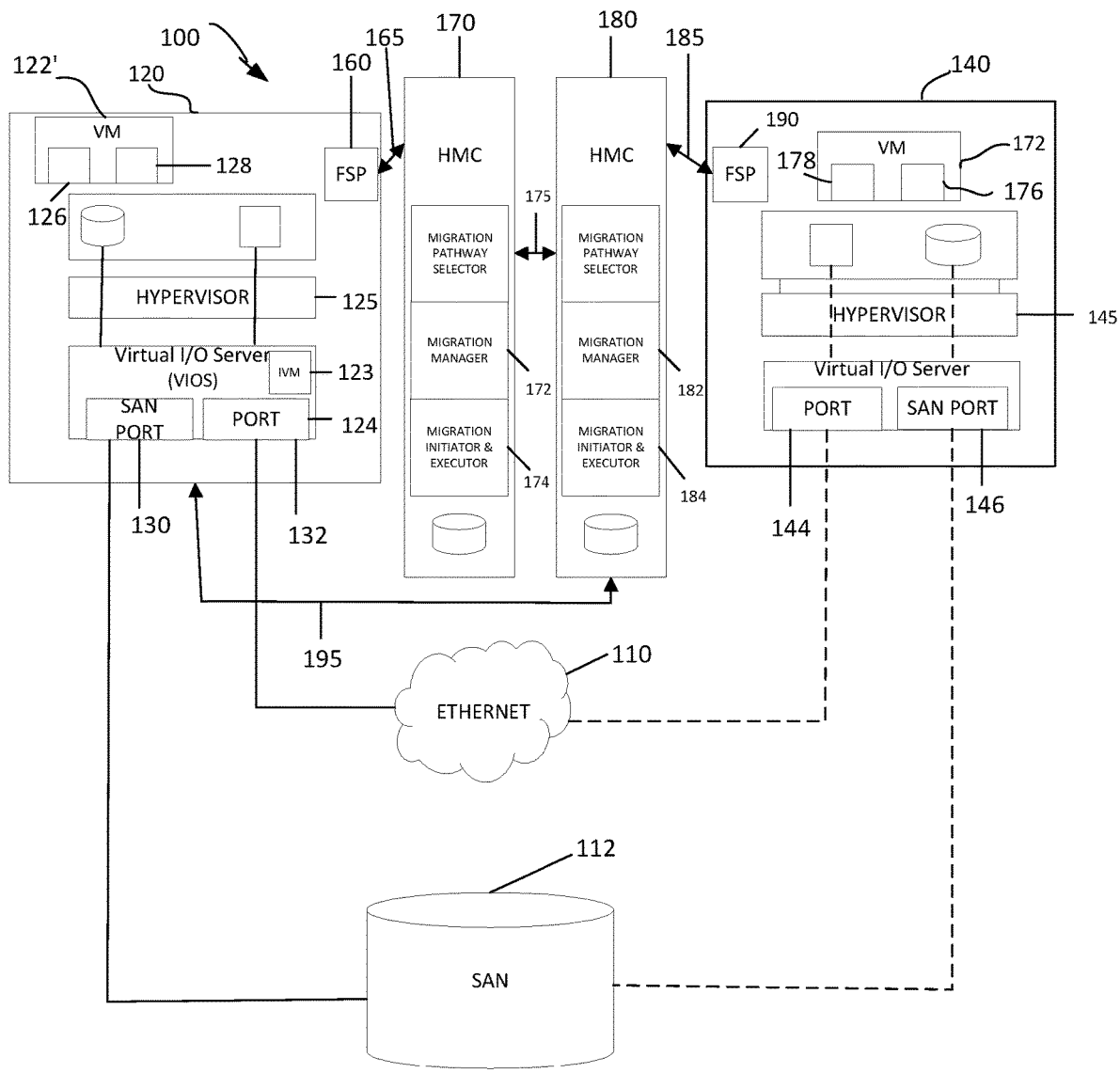
FIG. 3 is a functional block diagram illustrating a virtualized server computing environment during a logical partition migration operation, in accordance with an embodiment of the present invention.

As indicated earlier, a logical partition may be migrated or transferred from one system or server, e.g., the host, to another system or server, e.g., the target or destination, for numerous reasons, some of which include to perform maintenance on the system, for load balancing, for performance, for efficiency, as well as other reasons. In the partition migration method 200 of FIG. 2, at 210, the protocol for a logical partition migration is initiated. Before or during initiation, in an embodiment, a virtual machine on the source server, is identified to be migrated, e.g., the mobile partition, to another server, e.g., the target or destination server. FIG. 3 is a functional block diagram illustrating environment 100 at a point in time when a logical partition migration, preferably a live logical partition transfer or migration (LPM) is initiated, and a VM has been identified to be migrated from source server 120 to target or destination server 140. The VM identified for migration is designated mobile partition 122' in FIG. 3.

The system in an embodiment, at 220, checks for a logical partition request. When a logical partition or virtual machine migration is needed, a request is received by the management processor of both the source (host) server and target server (e.g., source FSP 160 and target FSP 190) as well as both migration consoles, e.g., source HMC 170 and target HMC 180. In an embodiment, the migration manager 172, and in an embodiment specifically the Migration Initiator and Executor Module 174, of the source migration console (e.g., HMC 170) will raise a logical partition migration request. In an embodiment, the logical partition migration request is raised by the source migration manager 172 by setting a migration flag on. In an embodiment, the migration manager 182, and in an embodiment the Migration Initiator and Executor Module 184, of the destination migration console, e.g., HMC 180, checks for new migration requests made by other systems or servers. In the case of a migration request, the target migration manager 182 finds the flag set to on.

Before the virtual machine or LPAR is migrated or transferred to the target or destination server, the system may undergo a validation process. In an embodiment, a controlling computer or migration console, such as, for example, a hardware management console (HMC), may undertake a validation process that may include, for example, verifying that the destination computer server has enough resources available to support the mobile partition. The validation process may include other operations, such as, for example, at 230 determining whether the management processor on the source server (system) is communicating with the migration console (e.g., HMC). For example, at 230, the system may determine whether or not the management or service processor, e.g., FSP 160, is operational, and/or whether the connection 165 between the management processor, e.g., FSP 160, and the migration console, e.g., HMC 150, is operational. In an embodiment, the system checks to determine whether the management processor (e.g., FSP 160) of the source server 120 and source migration console (e.g., HMC 170) can interact to facilitate transfer of the logical (mobile) partition from the source server (system) to a target server (system). In an embodiment, during the validation process it will be known and/or determined whether the management processor can communicate with the migration console.

In an embodiment, to detect whether the management processor and migration console are operational, a periodic signal is propagated or executed between the management processor of the source server (e.g., FSP 160) and the migration console (e.g., HMC 170). The signal may be initiated both ways in an embodiment. For example, a signal can be sent from the management processor to the migration console and vise-versa, from the migration console to the management processor. If either of the migration console or management processor, or the connection between the two, are down (e.g., not functional), then the management processor or migration console will not receive a counter response and will know that the other, or the connection, is not operational. Additionally, or alternatively, the signals may also be sent between the management processor (e.g., FSP 160) and the migration console (e.g., HMC 170) upon initiating or detecting a logical partition migration request.

If the management processor on the source server and the migration console are both operational and communicating with each other, then at 240, the mobile partition is migrated using the management processor on the source server and the migration console. In the scenario where the management processor (e.g., FSP 160) goes down, or the connection between the management processor and the migration console (e.g., HMC 170) is not operational, or where the source management console (e.g., FSP 160) and the source migration console (e.g., HMC 170) cannot communicate or are otherwise unable or unavailable to transfer the logical (mobile) partition, the state of the system, in an embodiment, changes from "operating" to "no-connection" in the migration console (e.g., HMC 170). If the source server does not have access to the source migration console, e.g., for any number of reasons, then at 250, the mobile partition is migrated to the destination server using an alternative channel where the management processor of the source server is not utilized. In an embodiment, the system may check the resources of the alternative channel. In an embodiment, a connection will be established between the source server and the migration console of the target server (system) through the alternative channel. The source system in an embodiment may determine the state of the source system if there is no communication with the source migration console (e.g., HMC 170), and in an embodiment verifies the required VIOS is operational. In an embodiment, the Integrated Virtualization Manager (IVM) in the source server (system) is provided with migration capabilities, and the migration capabilities are activated.

FIG. 3. depicts environment 100 during the partition transfer operation where the source management processor 160 and/or connection 165 between source the management processor 160 and the source migration console 170 are not operational. In this scenario, the logical partition transfer can not occur using the source management processor 160, or over its connection 165 with the source migration console 170. According to an embodiment, the system is configured to undergo logical partition migration or mobility using migration capabilities of the Integrated Virtualization Manager (IVM) on the VIOS of the source server. That is, in the exemplary embodiment of FIG. 3, migration of the logical (mobile) partition 122' is enabled, facilitated, and/or accomplished using the IVM 123 of the source VIOS 124. The IVM in an embodiment will act as the source migration console, e.g., source HMC. In an embodiment, a communications link 195 shown in FIG. 3 is established between the source server 120 and the target migration console 180.

Figure 4:
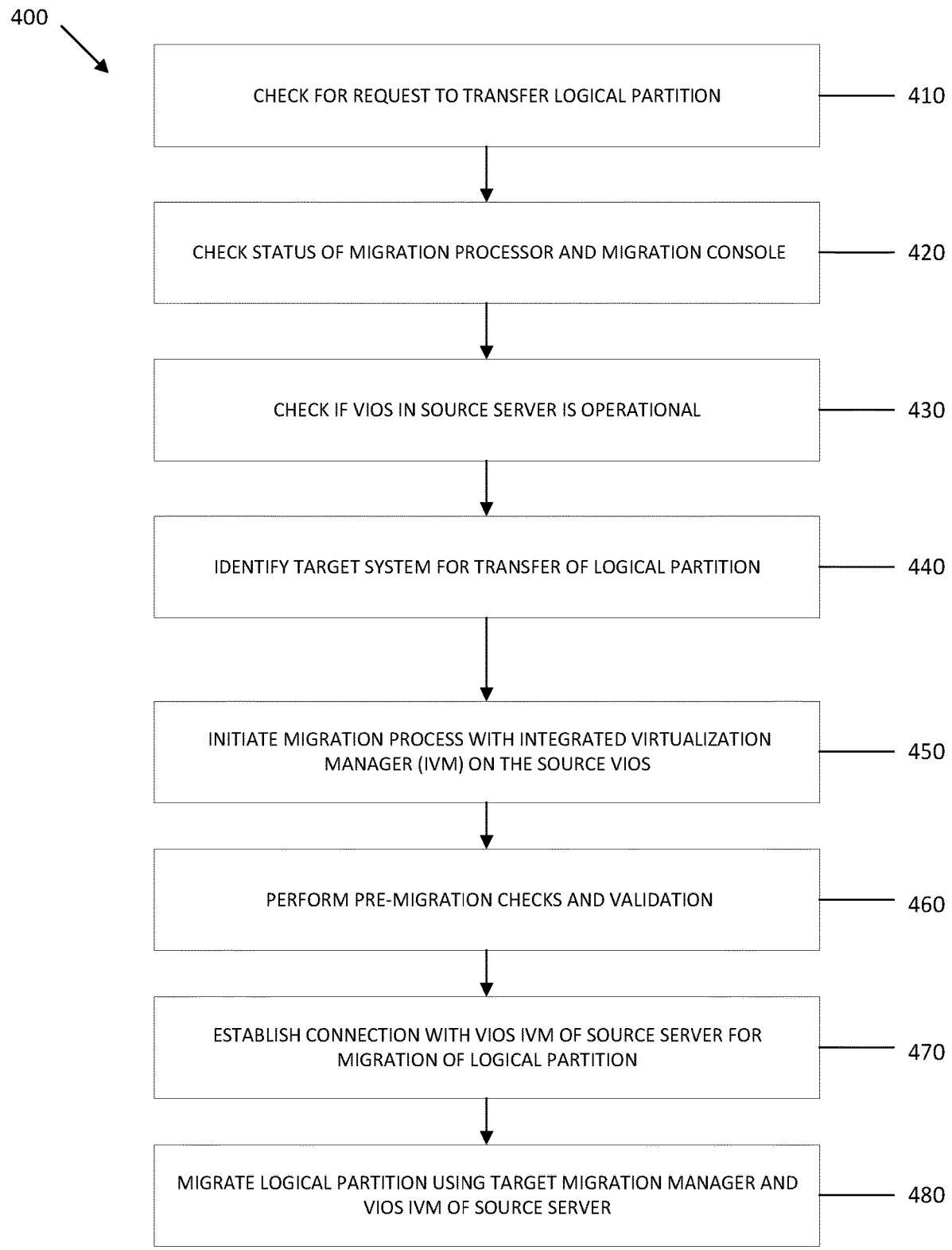
FIG. 4 is a flowchart depicting operational steps of a logical partition migration in accordance with an embodiment of the present invention.

FIG. 4 is an exemplary flowchart in accordance with one embodiment illustrating and describing a method of performing logical partition migration or transfer, more preferably live partition mobility, in accordance with one or more embodiments of the present disclosure. While the migration method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternate order.

In the migration method 400 of FIG. 4, the system initiates a logical partition migration (LPM) operation. During initiation, in an embodiment, a virtual machine or logical partition on the source server, is identified to be migrated e.g., the mobile partition, to another server, e.g., the target or destination server. FIG. 3 is a functional block diagram illustrating environment 100 at a point in time when a partition migration (LPM) is initiated and a VM has been identified to be migrated from source server 120 to target or destination server 140. The VM or logical partition identified for migration is designated mobile partition 122' in FIG. 3.

In the migration method 400 of FIG. 4, in an embodiment, at 410, the system checks for a request to transfer a logical partition or virtual machine form a source server. For example, the system 100 checks for a request to transfer a logical partition, e.g., VM 122', from source server 120. The system and/or method of checking for a migration request can be as discussed above with regard to the system and method of FIG. 2, or by a different system and/or method. At 420, the system checks the status of the management processor and the migration console. In an embodiment, source server or system 120 checks the status of the source management processor, e.g., FSP 160, and the source migration console, e.g., source HMC 170. The source server may check the status of the source management processor and the source migration console on a periodic basis or when a request to transfer a logical partition is pending.

If the management processor of the source system and the migration console are operational, including, for example, the connection between the management processor and the migration console, the logical partition may be migrated using the source management processor, e.g., source FSP 160, and the source migration console, e.g., source HMC 170. Additionally, or alternatively, the logical partition may be migrated according to the processes described in other embodiments, including the processes described in reference to FIGS. 2, 4 & 5.

If the management processor of the source server, e.g., source FSP 160, or the source migration console, e.g., source HMC 170, or the connection between the source management processor (FSP 160) and the source migration console (HMC 170) are not operational, or in alternative embodiments where the source management processor and source migration console and/or their connection are not operational to facilitate migration of the mobile logical partition to the target system or server, the source system or server (e.g., host 120) checks, at 430, if the VIOS 124, and in an embodiment the Integrated Virtualization Manager (IVM) 123, on the source server 120 is operational. The target system or server, e.g., target server 140, to receive the logical partition is identified in an embodiment at 440. In an embodiment, at 450, the migration process is initiated with the Integrated Virtualization Manager on the source server VIOS. For example, in FIG. 3, the migration console of the target system, e.g., target HMC 180, initiates the migration process with the Integrated Virtualization Manager module 123 on the source server VIOS 124. In an embodiment, the system at 460 performs pre-migration checks and validation. The target migration console, e.g., target HMC 180, in an embodiment performs the pre-migration and validation checks. This may include checking whether or not the target server or system has appropriate resources to handle the logical partition being migrated from the source server.

As part of initiating the migration process, the system at 470 may establish a connection with the source server. In an embodiment, at 470, the migration console of the target system, e.g., target HMC 180, establishes a connection with the VIOS of the source server, e.g., VIOS 124, to facilitate and/or permit the migration of the logical partition. The Integrated Virtualization Manager (IVM) 123 of the source server 120 in an embodiment connects with the target migration console, e.g., target HMC 180. In an embodiment, the target system, e.g., server 140, copies the profile of the partition to be transferred from the migration console of the source server (e.g., source HMC 170), performs a series of lock-based protocols on the Integrated Virtualization Manager (IVM) module (e.g., IVM 123) of the VIOS of the source server to indicate that it will be the target server (system), and pings the source server over the network (Ethernet).

The mobile partition is moved to the target or destination server at 480. In an embodiment, the target migration console and the IVM module on the VIOS of the source server migrates the logical partition. In the exemplary embodiment of FIG. 3, the target Hardware Management Console (HMC) 180 and the IVM module 123 on the VIOS 124 of the source server 120 migrates the logical partition to the target system or server 140.

Figure 5:
FIG. 5 is a flowchart depicting operational steps of migrating a logical partition in accordance with an embodiment of the present invention.

An exemplary method of transferring the logical partition to the target server (system) using dual channel, dual control is described in more detail with reference to FIG. 5. While the migration method 500 of FIG. 5 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

In an embodiment, the migration console of the target system, also referred to as the target migration console, initiates the migration process at 510 with one of the Integrated Virtualization Manager (IVM) modules of the VIOS in the source system that is migration capable. For example, in the exemplary embodiment of FIG. 3, the target migration console 180, and in an embodiment the migration manager 182, initiates the migration process with IVM module 123 of the VIOS 124 of the source server 120. The IVM module 123 is configured and enabled to perform migration of logical (mobile) partitions or virtual machines. In an embodiment, at 520 the system performs a series of locks-unlocks and type specifications to facilitate migration of the logical partition. In an embodiment, the target migration console, e.g., target HMC 180, and in a preferred embodiment the target migration manager 182, performs a series of locks-unlocks and type specifications to facilitate and enable migration of the logical (mobile) partition. A series of transfer cycles is performed in an embodiment of the migration procedure that is similar to what is performed using the source management processor and the source migration console by known methods.

In an embodiment of a migration procedure, at 530, the system verifies pre-migration checks, validation and required data collection are performed. The target migration console, e.g. target HMC 180, verifies pre-migration checks, validation and required data collection are performed. The process in an embodiment includes at 540 the target migration console, e.g., target HMC 180, preparing for migration. Preparing for migration in an embodiment, may include at 550 the target migration console, e.g., target HMC 180, creating a new logical partition in the target server (system) with the same capabilities as the logical partition in the source server (system), and/or in an embodiment, at 560, creating profiles for the logical partition that are the same in number as the source system.

The method of dual-control migration of logical (mobile) partitions or virtual machines may continue, at 570, by assigning resources like CPU and memory, and/or creating virtual I/O mappings. For example, the target system or server assigns the logical partition associated with the target system resources like CPU and memory, and creates virtual I/O mappings for the logical partition associated with the target system. At 580, the migration process is started between the source IVM (e.g., IVM 123) and target migration console (e.g., target HMC 180) by preparing the source operating system (OS) for logical partition migration, transferring the partition state on the source system to the target system, and resuming the partition state on the target system. Preferably, the target migration console (e.g., target HMC 180) prepares the source operating system for logical partition migration, transfers the partition state on the source system (server) to the target system (server), and resumes or activates the partition on the target system (server). Unused resources of the source partition is cleaned up by the source IVM VIOS server at 590.

The disclosed system and method permits and provides the ability to migrate a logical partition in a virtual computing environment where input and output functions (I/O) can be continued after virtual machine or logical partition migration, and in a manner so that applications preferably are not disturbed or interrupted. The disclosed system and method permits multi-channel, multi-control migration of logical partitions. In an embodiment, dual-channel migration of a logical partition is permitted in the disclosed system and method where VIOS migration capabilities are provided, and may be leveraged, as part of the Integrated Virtualization Manager code. The system and method may be utilized when the management or service processor (e.g., FSP) and source migration console (e.g., the HMC) are both down. The system and method provide redundancy so that multiple channels, and at least dual channels, can be utilized to migrate a logical partition, and in an embodiment contemplates utilizing the migration functionality of the IVM of the VIOS in a source server as a back-up to provide migration of a logical partition. The mitigation manager in the migration console, e.g., HMC, and in particular the Integrated Virtualization Manager (IVM) may be provided with programming and software to enable the capabilities and methods disclosed herein.

Figure 6:
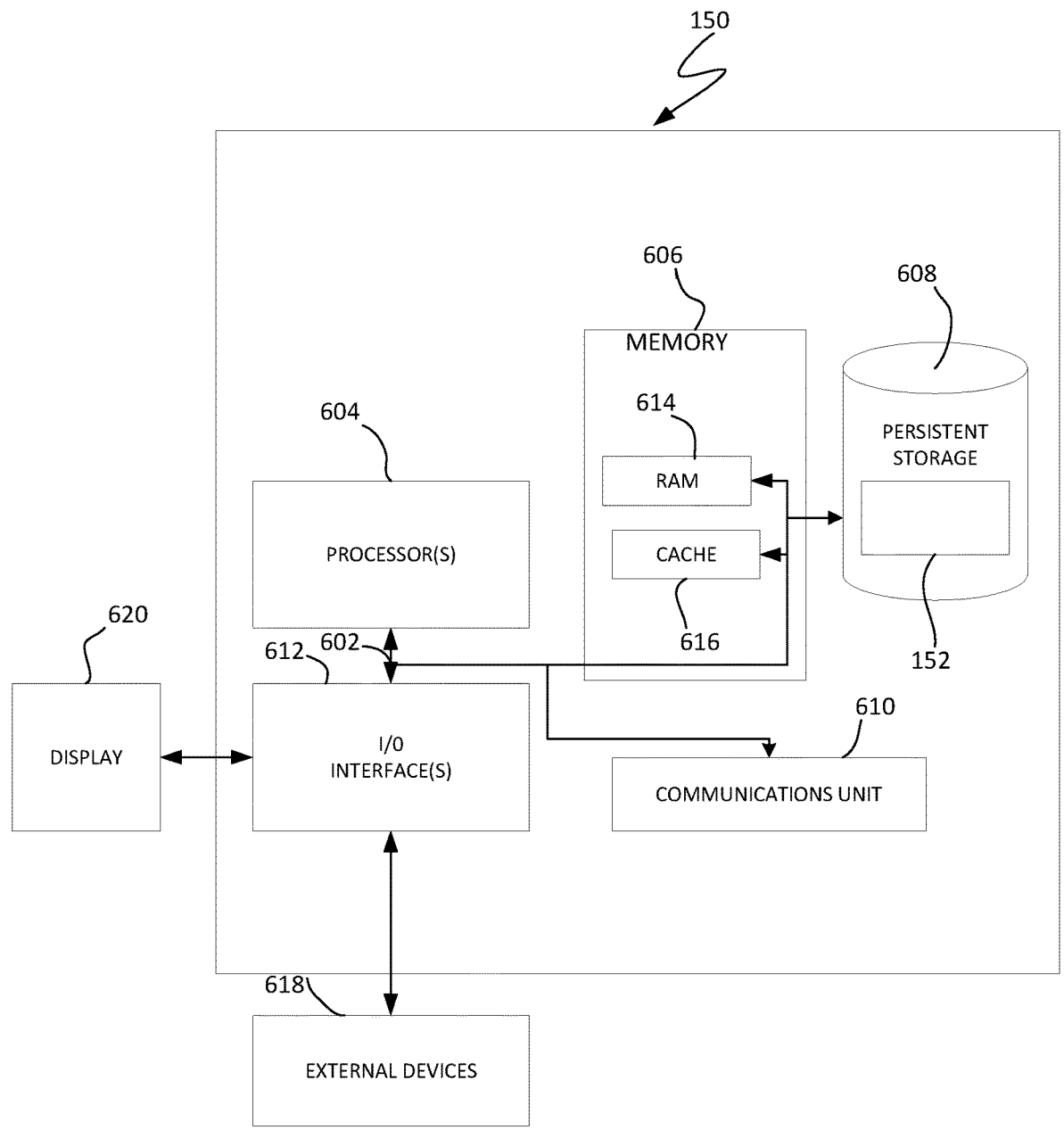
FIG. 6 depicts a block diagram of components of the hardware management console executing the partition migration program, in accordance with an embodiment of the present invention.

FIG. 6 depicts a block diagram of components of hardware management console (HMC) 150 (and migration consoles 170 and 180) in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Hardware management console 150 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer readable storage media.

Migration managers 152, 172, and 182 are stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of source server computer 120, destination server computer 140, and storage server 112. In these examples, communications unit 610 includes one or more network interface cards. Communications unit 610 may provide communications through the use of either or both physical and wireless communications links. Mitigation Managers 152, 172, and 182 may be downloaded to persistent storage 608 through communications unit 610.

I/O interface(s) 612 allows for input and output of data with other devices that may be connected to hardware management consoles 150, 170 and 180. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., migration manager program 152, 172, and 182 can be stored on such portable computer-readable storage media and can be loaded onto persistent storage 608 via I/O interface(s) 612. I/O interface(s) 612 also connect to a display 620. Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of migrating a logical partition in a computing environment, the computing environment comprising a source computer system and a target computer system, the method comprising:
   initiating a transfer of the logical partition on the source computer system to the target computer system;
   checking a status of a source management processor on the source computer system and a source migration console associated with the source computer system to determine whether the source management processor and source migration console are capable of transferring the logical partition to the target computer system;
   determining the source management processor and the source migration console are incapable of transferring the logical partition to the target computer system;
   transferring the logical partition from the source computer system to the target computer system using an alternative channel where a Virtual Input/Output Server (VIOS) of the source computer system, a target management processor on the target computer system and a target migration console associated with the target computer system are utilized, and both the management processor of the source computer system and the source migration console are not utilized.

2. The method according to claim 1, further comprising checking that the target computer system has the resources to support the transfer of the logical partition from the source computer system.

3. The method according to claim 1, further checking for a request to transfer the logical partition.

4. The method according to claim 1, wherein checking the status of the source management processor and source migration console includes at least one of the group consisting of checking whether the source management processor is operational, checking whether the source migration console is operational, checking whether the connection between the source management processor and the source migration console is operational, and combinations thereof.

5. The method according to claim 4, further comprising sending a periodic signal between the source management processor and the source migration console.

6. The method according to claim 1, further comprising, in response to the source management processor and the source management console being incapable of transferring the logical partition from the source computer system to the target computer system, identifying the target computer system to receive the logical partition, and establishing a connection between the target migration console connected to the target computer system and the VIOS of the source computer system.

7. The method according to claim 1, further comprises creating a new logical partition in the target computer system with the same capabilities as the logical partition on the source server, preparing an operating system for the logical partition in the target computer system, transferring the partition state of the source server to the target computer system, and resuming the partition state on the target system.

8. The method according to claim 1, further comprising checking whether the VIOS on the source computer server is operational.

9. The method according to claim 8, further comprising checking that the VIOS has an Integrated Virtualization Manager (IVM) that has logical partition migration capabilities.

10. The method of claim 9, further comprising identifying the target computer server to receive the logical partition.

11. The method according to claim 10, further comprising providing a direct connection between the source computer system and the target migration console associated with the target computer system.

12. The method according to claim 11, further comprising initiating the migration process with the IVM of the VIOS on the source computer system.

13. The method according to claim 12, further comprising migrating the logical partition using the IVM of the VIOS on the source computer system and the direct connection between the source computer system and the target migration console.

14. The method of claim 1, further comprising:
   identifying the target computer system to receive the logical partition;
   establishing a connection between the target migration console connected to the target computer system and a Virtual Input/output Server (VIOS) of the source computer system; and
   invoking an integrated Virtualization Manager (IVM) on the VIOS of the source computer system to transfer the logical partition from the source computer system to the target computer system.

15. A system providing for transfer of a logical partition in a virtualized computing system, the system comprising:
   a source server having the logical partition, a source management processor, and a Virtualized Input/Output Server (VIOS), wherein the VIOS has logical partition migration capabilities;
   a source migration console for connection to the source management processor on the source server;
   a target server for receiving the logical partition, the target server having a target management processor;
   a target migration console associated with the target server,
      wherein the system is configured to transfer the logical partition using the VIOS on the source server and the target migration console;
      wherein the system is configured to transfer the logical partition using the source management processor, the source migration console, the target migration console, and the target management processor; and
      wherein the system is further configured to transfer the logical partition to the target server using the VIOS, the target migration console and the target management processor if the system is incapable of transferring the logical partition using the source management processor and the source migration console.

16. The system of claim 15, wherein the VIOS on the source server further comprises an Integrated Virtualization Manager (IVM) configured and programmed to have logical partition migration capabilities, wherein the system is configured to prepare a direct connection between the VIOS of the source server and the target migration console; and to transfer the logical partition to the target server using the IVM.

17. A computer system for transferring a logical partition from a source server to a target server, the computer system comprising:
   one or more computer processors;

one or more computer readable non-transitory storage media; and program instructions stored on the one or more computer readable non-transitory storage media for execution by at least one of the one or more computer processors, the program instructions comprising:

program instructions to initiate transfer of the logical partition from the source server to the target server;

program instructions to transfer the logical partition from the source server to the target server using a source management processor associated with the source server, a source migration console associated with the source management processor, a target migration console connectable to the source migration console, and a target management processor on the target computer system connectable to the target migration console;

program instructions to transfer the logical partition from the source server to the target server using a Virtual Input/Output Server (VIOS) associated with the source server, the target migration console and the target management processor;

program instructions to check for requests to transfer the logical partition;

program instructions to check the status of the source management processor and the source migration console associated with the source server to determine whether the source management processor and the source migration console are capable of transferring the logical partition;

program instructions to use the source management processor and source migration console to transfer the logical partition to the target sever if the source management processor and the source migration console are capable of transferring the logical partition;

program instructions to use the VIOS associated with the source server to transfer the logical partition if the source management processor and the source migration console are incapable of transferring the logical partition; and program instructions to check the VIOS of the source server to determine whether the logical partition migration capabilities of the VIOS on the source server are activated.

18. The computer system of claim 17, further comprising:

programming instructions to establish a direct connection between the VIOS of the source server and the target migration console associated with the target server in response to a request to transfer the logical partition and if the system is incapable of transferring the logical partition using the source management processor and the source migration console; and program instructions to initiate the transfer of the logical partition using the target migration console and an Integrated Virtualization Manager (IVM) on the source server.

* * * * *